M. Gunshenan,
Farm Gate.
No. 101,998.  Patented Apr. 19, 1870.
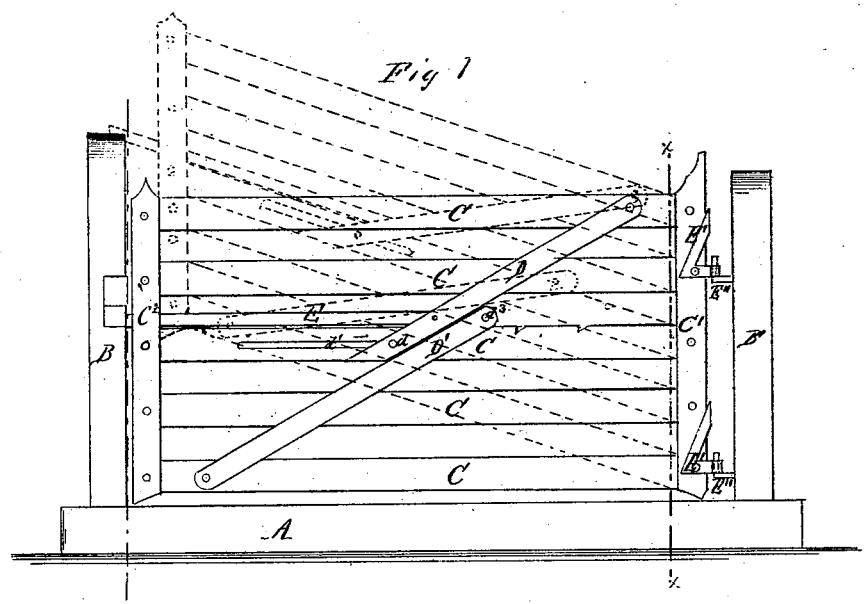
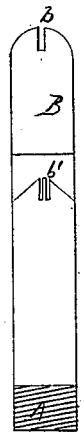
Witnesses
Anthony F. Connolly
N. W. Myggatt
Inventor
Michael Gunshenan
by his atty.
Thos. A. Connolly.

United States Patent Office.

MICHAEL GUNSHENAN, OF NEW YORK, N. Y.

Letters Patent No. 101,998, dated April 19, 1870.

IMPROVEMENT IN FARM-GATES.

The Schedule referred to in these Letters Patent and making part of the same.

I, MICHAEL GUNSHENAN, of New York, in the county of New York and State of New York, have invented certain Improvements in Farm-Gates, of which the following is a specification.

These improvements relate to the construction of the hinges, by which the gate swings from side to side, and which are prevented from sinking or becoming loose by the weight of the gate; also, to the peculiar construction and arrangement of the gate itself, for the purpose of providing an automatic latch, and of allowing the gate to be elevated at its forward end, and be thus retained, so as to swing over any obstacle, as in the case of snow, or, when closed, to allow small cattle to pass under it.

In the accompanying drawings—

Figure 1 is a side elevation of gate and posts.
Figure 2 is a rear end view of gate.
Figure 3 is a vertical section on line $x\,x$, fig. 1.
Figure 4 is a face view of front post.

A is the gate-sill.

B the front, and B' the rear post, to the latter of which the gate is hinged.

C are the horizontal gate-bars, and $C^1$ $C^2$ the battens, by which said horizontal bars are held in place, and to which they are pivoted, so that the forward end of the gate may be raised, as represented by dotted lines in fig. 1, without throwing the battens at either end out of a vertical position.

D D' are double braces. The former is pivoted to the top horizontal gate-bar, near its rear end, and thence reaching forward diagonally to the middle horizontal bar, is held by a pin, $d$, which is made to pass through a slot, $d^1$, cut longitudinally in the middle bar. The latter brace is pivoted to and near the forward end of the lowest horizontal bar, and thence reaches back diagonally and behind the lower end of the upper brace.

The rear ends of the two bars composing this brace are connected by a pin, $d^3$, above the upper edge of the middle slotted horizontal bar, which is notched to receive it.

E is a latch-bar, pivoted between the bars of the upper brace, and thence extending forward, as shown in fig. 1, passes between the vertical bars of the front double batten $C^2$, its end, when the gate is closed, resting in a suitably-formed recess in the forward gate post B.

In said post there are formed two recesses—one, $b$, in the top of the post, to hold the latch when the gate is raised, and the other, $b'$, at a proper height for the latch when the gate is in the ordinary position. The latter recess is open, and properly beveled at the sides for the end of the latch to pass in and out.

E' are the hinges, which are formed with an eye, each to fit on the hooks E'', and extend around on either side of the end batten, being attached thereto by a single pin, and thence reach upward and around the end of the gate, as clearly represented in the drawings.

When the gate is raised the braces D D' are moved in contrary directions, the upper brace pushing the latch forward, so as to enable it to rest in the recess $b$. The lower brace, by means of the pin resting in one of the notches cut in the middle horizontal bar, holds the gate locked in an elevated position without hindering it from swinging. Independently of this, the gate may be held up by the force of the braces acting in opposite directions.

With reference to the hinges, it will be observed that the weight of the gate, tending to draw them down, inasmuch as each is held by a single pin, causes the upward extension to press against and constitute a counteracting brace, so that the greater the weight (within reasonable bounds) the more firmness is given to the hinges.

Having described my invention,

What I claim as new, and desire to secure by Letters Patent, is—

1. The latch E, arranged to operate as described, in combination with the brace D and post B, for the purpose specified.

2. The brace D' and notched horizontal bar, in combination with the brace D and latch E, arranged to operate as and for the purpose set forth.

3. The hinges E', when constructed and applied as and for the purpose described.

MICHAEL GUNSHENAN.

Witnesses:
L. A. LUCE,
I. A. FRENCH.